United States Patent [19]
Mowry

[11] Patent Number: 5,687,011
[45] Date of Patent: Nov. 11, 1997

[54] SYSTEM FOR ORIGINATING FILM AND VIDEO IMAGES SIMULTANEOUSLY, FOR USE IN MODIFICATION OF VIDEO ORIGINATED IMAGES TOWARD SIMULATING IMAGES ORIGINATED ON FILM

[76] Inventor: Craig P. Mowry, 180 Central Park South, No. 33, New York, N.Y. 10019

[21] Appl. No.: 407,597

[22] Filed: Mar. 20, 1995

Related U.S. Application Data

[63] Continuation-in-part of Ser. No. 264,433, Jun. 23, 1994, Pat. No. 5,457,491, which is a continuation-in-part of Ser. No. 922,701, Aug. 6, 1992, Pat. No. 5,374,954, which is a continuation-in-part of Ser. No. 595,082, Oct. 11, 1990, Pat. No. 5,140,414.

[51] Int. Cl.$^6$ ....................................... H04N 3/36
[52] U.S. Cl. ..................... 358/527; 348/97; 348/104
[58] Field of Search ............................ 348/96–104, 577, 348/578, 650, 651; 358/518, 527, 525; H04N 3/36, 1/56

[56] References Cited

U.S. PATENT DOCUMENTS

| | | |
|---|---|---|
| 4,606,625 | 8/1986 | Geswind . |
| 4,642,700 | 2/1987 | Ohta et al. ................... 358/527 |
| 4,771,342 | 9/1988 | Beesley . |
| 4,935,816 | 6/1990 | Faber . |
| 5,027,196 | 6/1991 | Ono et al. .................... 358/527 |
| 5,140,414 | 8/1992 | Mowry ......................... 348/97 |
| 5,157,506 | 10/1992 | Hannah ........................ 358/527 |
| 5,223,891 | 6/1993 | Fierstein et al. ............. 348/97 |
| 5,264,946 | 11/1993 | Takakura et al. . |
| 5,329,383 | 7/1994 | Collette ....................... 358/527 |
| 5,335,013 | 8/1994 | Faber . |
| 5,374,954 | 12/1994 | Mowry ......................... 348/97 |
| 5,406,326 | 4/1995 | Mowry ......................... 348/97 |
| 5,412,773 | 5/1995 | Carlucci et al. ............. 348/97 |

*Primary Examiner*—Kim Vu
*Attorney, Agent, or Firm*—Ostrolenk, Faber, Gerb & Soffen, LLP

[57] ABSTRACT

Digital signals are generated and stored for each pixel of a frame of a video originated material. A computer reads the digital signals and converts them to binary image data by employing a program to reassign color and black component values for each pixel. The component value reassignments performed by the computer are a primary component modification step. The primary component modification step, in one embodiment, comprises component modifications by selected image zones of the video originated images, based on color data within actual filmed images originated simultaneously as the video images. The film origination and video origination are preferably provided by the same camera, with image data delivered for both through the same lens by way of a "beam-splitter" device. The primary component modified digital data is assembled and a secondary modification may also be performed. Film stock emulsion grain patterns are introduced to the images in the second modification step. Digital devices may be employed wherein random or pseudorandom digital noise is added to each image. Alternatively, the modified video image may be videoprojected onto a selected translucent film surface from which the image is videographed, thereby embodying the film grain pattern from the film surface. A digital film recorder may also be used to record the component modified video image within the emulsion of unexposed, photographic film stock.

33 Claims, 8 Drawing Sheets

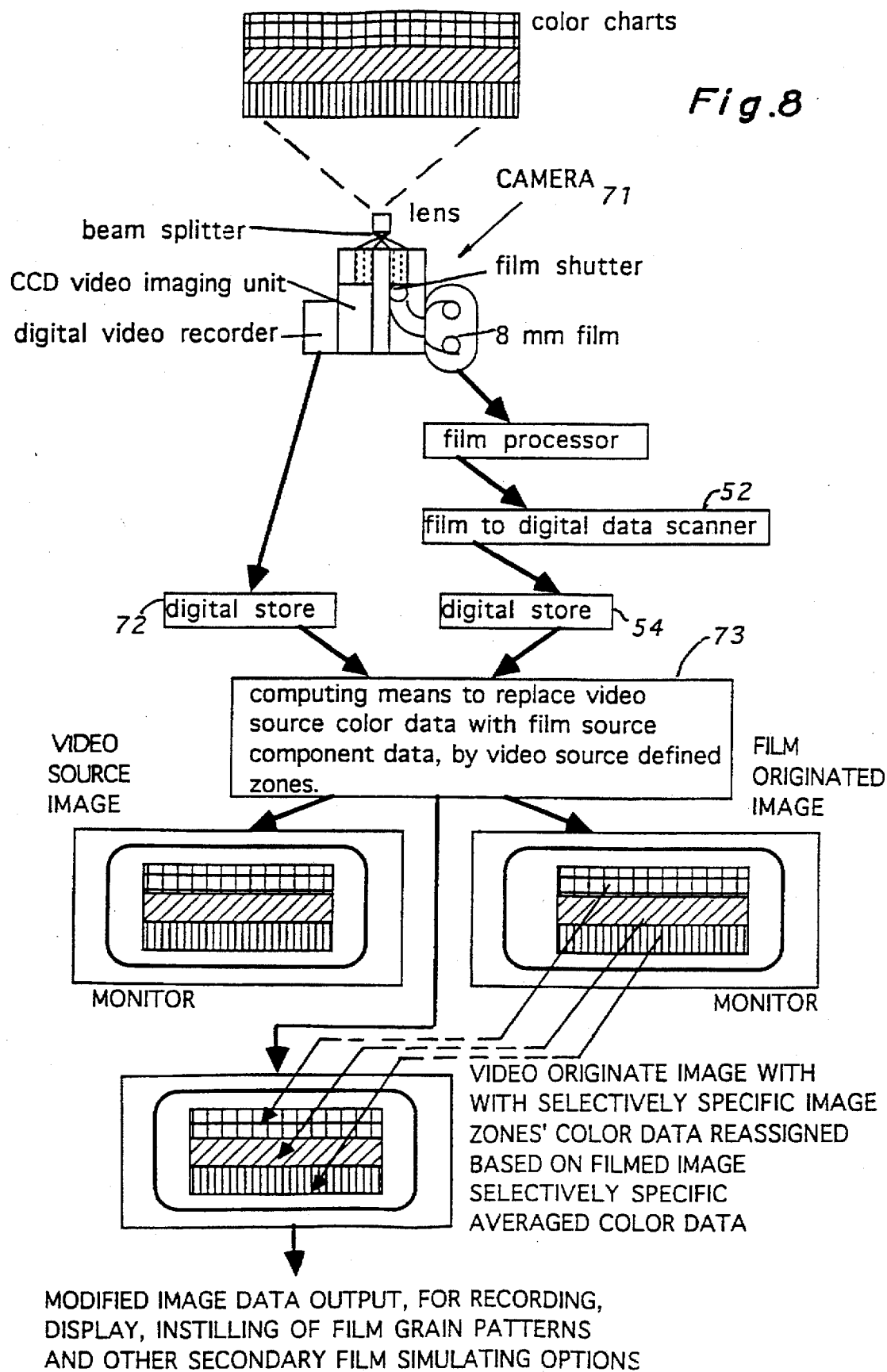

SYSTEM FOR ORIGINATING FILM AND VIDEO IMAGES SIMULTANEOUSLY, FOR USE IN MODIFICATION OF VIDEO ORIGINATED IMAGES TOWARD SIMULATING IMAGES ORIGINATED ON FILM

BACKGROUND OF THE INVENTION

This application is a Continuation-In-Part of Ser. No. 08/264,433, filed Jun. 23, 1994, U.S. Pat. No. 5,457,491 which is a Continuation-In-Part of Ser. No. 07/922,701 filed Aug. 6, 1992, now U.S. Pat. No. 5,374,954, which is in turn a Continuation-In-Part of Ser. No. 07/595,082, filed Oct. 11, 1990, now U.S. Pat. No. 5,140,414.

OBJECT OF THE INVENTION

The system of the present invention seeks to arrive at an aesthetically acceptable simulation of the appearance images originated on different motion picture and other photographic film stocks embody after telecine "flying spot scanner" transfer to video, from taped high definition video originated images. Furthermore, the invention seeks to provide new options in processing video originated material, not limited to approximating the results images originated on a film stock would have manifested on video of a given videographic subject.

This invention relates to the simulation of video images originated on motion picture and other photographic film stocks, from high definition video originated material stored on video tape.

Film has been the preferred recording medium on which to originate many productions broadcast on television for years because of the sophisticated visual impression provided by the character of film stocks' color response and the general audience familiarity with the appearance resulting from filmed material presented on television; the resulting "look", a product of the photo-chemical process preceding the production of television signals representative of the image stored in the photo-chemical process, differs in several ways from video originated material of an identical photographic subject. Two key ways in which it differs is the focus of this invention: The color and grey scale component value response in each pixel of the resulting image on a television monitor; and the subtle visual impression made by the textured appearance of film grain, which is inherent to images stored within motion picture film emulsion and photographic film in general.

Though color negative film has the ability to reproduce abundantly more color and grey scale gradients than video originated images, when video images are created from filmed images by means of a standard telecine "flying spot scanner" transfer, an illusion of the entire range of film's color response is maintained. This phenomenon, occurring within the scope of the video medium, provides that constants exist that can define the variation in pixel response between film and video originated images shot under identical lighting conditions, when viewed on video monitors: It is the combination of filmed information as it can be reproduced on a monitor that provides the overall maintenance of the "film look", and each separate color component combination of each pixel of film originated image is in fact available and employed by video originated images, though in response to a different photographic stimulus in almost every case.

The video data resulting from a telecine transfer defines filmed images in video terms, so the medium in question is in fact video, and the parameters and actual subtleness of projected filmed images are not the issue. Rather, the video data assigned to a resulting pixel representing a zone of film emulsion is an averaging process provided by video standards and color and grey scale gradients recognized as those registered and visible on standard television receivers.

Digital video technology has provided that digital data defines video images and encodes the color and grey component values for each pixel in addressable sequences, able to be "read" and "rewritten" into a store. Therefore, given uniform and predominantly shadow-free lighting and even color temperature during original videotaping, and careful slating of this data for each shot in foot candles and degrees kelvin respectively, digital data logged from pixel response of color data originally stored in film stock emulsion, under the same light intensity and color temperature conditions, can be referenced according to principal videographic variables and inserted in place of the original video color data. This would create an aesthetic compromise that permits approximation of potentially any film stock's anticipated response to the same stimulus represented in video form.

Existing technology for the printing industry and digital video provide for scan-sequential and specifically addressed pixel component modifications according to look-up-table data, as the system of the present invention may employ, (i.e., U.S. Pat. Nos. 4,727,425; 4,710,806).

Existing technology in two other areas provides further options for the present invention, toward the goal of simulating filmed images from video originated images:

Sophisticated beam splitter devices, capable of dividing an image delivered through a single lens for recording by both photographic film and a "video tap" unit, now provide a sufficient amount of the lens image to properly expose for image reproduction by film and a CCD video chip, within a fiber optic "video tap" device. Presently, at least a 460 line, "flicker-free" broadcast-quality video image can be captured while the same lens image exposes a selected film stock, of a selected gauge size, properly. The present invention utilizes this new flexibility, not for the primary purpose of allowing for pre-editing of video for reference when selecting filmed shots to be edited, but for the purpose of providing filmed reference frames on a selected "reference" film stock, preferably on a small film gauge size, for use in reassigning color data within the video images recorded of the same scene(s) for the purpose of simulating the color response of the selected "reference" film stock.

Further technology, presently available, would then allow for a selected means to identify image zones within the video image(s), to be referenced against the same corresponding zones in the filmed images, for selectively specific modification of the video zones to imitate the selectively averaged zone color values within the filmed image(s). Further, present means also would provide that a single filmed image can serve as the color reference frame for a number of video images from the same scene, as is often the process in black and white feature film colorization processes, allowing for a small number of small gauge size filmed images, (perhaps 8 mm in width,) to provide ample data to satisfactorily "recolorize" all of the video originated material to be modified.

New high definition television systems and video projection systems capable of manifesting a high definition compatible number of scanning lines provide the means for executing a process whereby actual film grain within celluloid emulsion can be married with a projected image, and videographed with a loss in image clarity low enough to produce a final result which provides a film "look" to images at an aesthetically acceptable sacrifice to the original high definition integrity of the video images. Present systems strive to simulate film grain appearances digitally, with a result that is visibly different from actual film grain appearances on monitors, following a telecine "transfer." By incorporating the general videography-of-film operating basis of telecine devices, high definition projection and camera units mounted on tracks, with macro lensing, "gen-lock" synched together, and matching scan lines to the highest degree possible, can capture a complete video frame as it is projected on a grey emulsion surface of optional size. This recreation of a video signal of a high number of scanning lines from a high definition projection would have a resulting actual clarity substantially less than that of the original video material, but with the aesthetic look of film originated images. Present systems for providing an NTSC signal from a high definition signal may be employed at this stage, or the signal may be maintained as a higher definition signal for recording, monitoring or broadcasting.

Other existing means may be employed after the color data modification step of the present invention, in lieu of the physical videography of projected images manifested on celluloid. Those means may include: The addition of video "noise" to each video image, pseudorandom digital video noise being preferable; or, the physical recording of the color-modified video images onto photographic film, by way of an existing digital film recorder, which then may provide images on film which may be re-scanned to a video format for recording, now embodying the emulsion grain aspect of the film on which the images were recorded.

So, for many television applications where film is shot for telecine transfer to video, there are benefits to be gained by employing the system of the present invention. At the production level: a television camera is employed instead of a film camera, providing silence; immediate screening of the actual material shot; immediate sound synching; lesser risk of reshoots from screening original material for problems immediately; and no expense of negative film. In post production: processing of film, transfer to video and sound synching are not needed; having shot video, dailies need not be awaited; all shot selections destined for final modification by the system of the invention are made at preliminary "off-line" edit sessions, minimizing the actual amount of material submitted for modification and thus time charges as opposed to a film shoot where typically all material must be transferred to tape, at substantial expense, for initial screening; and during modification by this system, a variety of film stock component response and film grain options may be previewed and imparted to the original video material, providing a unique range of new post-production aesthetic effects to video originated material.

In addition to the patents discussed above, United States patents providing a general background to the present invention are as follows:

| | | | |
|---|---|---|---|
| 3,637,937 | 1/1972 | Deveson | 355/83 |
| 3,707,599 | 12/1972 | Brown | 358/346 |
| 4,268,865 | 5/1981 | Millward | 358/216 |
| 4,389,668 | 6/1983 | Favreau | 358/83 |
| 4,453,178 | 9/1984 | Moriguchi | 358/60 |
| 4,514,818 | 4/1985 | Walker | 364/521 |
| 4,633,416 | 12/1986 | Walker | 364/521 |
| 4,684,990 | 8/1987 | Oxley | 358/22 |
| 4,710,806 | 9/1987 | Iwai/Uno | 358/81 |
| 4,727,425 | 9/1988 | Mayne | 358/80 |
| 4,771,342 | 9/1988 | Beesley | 358/335 |

-continued

| | | | |
|---|---|---|---|
| 4,782,397 | 9/1988 | Kimoto | 358/252 |
| 4,839,721 | 9/1989 | Abdulwahab | 358/80 |
| 4,885,787 | 9/1989 | Okamoto/Kida | 382/54 |
| 4,894,724 | 9/1990 | Welkowsky | 358/231 |
| 4,899,216 | 9/1990 | Tatsumi | 358/80 |
| 4,901,161 | 9/1990 | Giovanella | 358/346 |
| 4,901,258 | 9/1990 | Akiyama | 364/577 |
| 4,935,816 | | Faber | |
| 5,264,946 | 11/1993 | Takura | 358/466 |
| 5,335,013 | | Faber | |

SUMMARY OF THE INVENTION

The system according to the present invention provides means for digitally modifying high definition video originated images shot under even, controlled lighting conditions, in one embodiment according to look-up-table programs based on film-originated digital color and black component binary response logs.

The invention furthermore provides, in one embodiment, a secondary means for imparting a variety of possible film-grain "textured" appearances to the image resulting from the primary modification with an apparatus which videographs a video projection of the color modified, high definition video signal from off an emulsion layer of variably dark strips of motion picture film.

Standard video response to each gradient of red, green, blue and black distinguishable by broadcast television is derived from analyses of digital response data to color chart gradients, by a predictably responsive high definition video camera model, designated as a component of this system. The film originated digital "responses" are derived from cinematography of the same color charts under the same lighting conditions, with the conversion to digital video provided by a precisely adjusted telecine, "flying spot scanner" apparatus; binary data pertaining to single pixel component values are then logged accordingly. These digital results; the range of original video color data each digital "response" commands; and the number of charts assembled for a given film stock program, (designated and compiled according to combinations of original videography lighting conditions), define the amount of data held within each "look up chart" program and thus the color and grey-scale gradient reproduction detail available in a given film stock simulation program.

According to one aspect, the invention relates to a video signal modification system for converting video originated images into final video images simulating images originated from photographic film stocks, the modification system including: means for modifying component values of pixels within the video originated image to approximate anticipated component results of each pixel had a selected film stock been the original image storing medium; computing means coupled to said modifying means for reassigning values for said component values of picture pixels in said video originated images for substantially each said picture pixel within each frame of said video originated images in dependence on said modified component value selected from said modifying means and thereby producing intermediate video images; and means for producing said final video images from said intermediate video images.

According to this embodiment, the means for modifying comprises means for holding conversion data which correlates component values of picture pixels in the originated images with modified component values, the conversion data being selectible for the picture pixel based on a plurality of parameters; the conversion data being compiled and recallable according to a selected photographic film stock to be simulated according to principal videographic variables.

The principal videographic variables comprise any one or any combination of the following parameters which include:

(a) color temperature of light illuminating the subject area being videographed;

(b) brightness of light illuminating the subject area being videographed; and (c) a selected camera setting of a camera used to originate images destined for modification.

According to another aspect, the invention relates to a video signal modification system for simulating video images originated on photographic film stocks from video originated images, including: computing means for reassigning color and black component values for each pixel, within each frame of a video originated image, based on digital component modifications; computing means for reassigning values for the component values for substantially each picture pixel within each frame of the video originated images in dependence on the modified component value and thereby producing intermediate video images; means for instilling selected film grain patterns of optional density and size to the intermediate video images; and final image producing means for producing the final video images from the intermediate video images which have had the film grain patterns instilled therein.

According to yet another aspect, the invention relates to a method for converting video originated images into final video images simulating images originated from photographic film stocks, the method including:

modifying component values of pixels within the video originated image to approximate anticipated component results of each pixel had a selected film stock been the original image storing medium;

reassigning values for the component values of picture pixels in the video originated images for substantially each picture pixel within each frame of the video originated images in dependence on the modified component value selected from the memory and thereby producing intermediate video images; and producing the final video images from the intermediate video images.

According to yet still another aspect, the invention relates to a method for simulating video images originated on motion picture or other photographic film stocks from video originated images, including: reassigning color and black component values for each pixel, within each frame of a video originated image, based on digital component modifications; reassigning values for the component value for substantially each picture pixel within each frame of the video originated images in dependence on the modified component value and thereby producing intermediate video images; instilling selected film grain patterns of optional density and size to the intermediate video images; and producing the final video images from the intermediate video images which have had the film grain patterns instilled therein.

According to yet still a further aspect, the invention relates to a method for simulating video images originated on motion picture or other photographic film stocks from video originated images, including: reassigning color and black component values for each pixel, within each frame of a video originated image, based on digital component modifications; storing programs on which the digital component modifications are based, instilling film grain patterns of optional density and size, to the images resulting from a videoprojection of frame store data derived from primary digital modification; and videographing the videoprojection with a camera unit, aligned to and with technical means to maintain a high degree of the projected image's integrity.

According to yet still another aspect, the invention relates to a method for converting video originated images into final video images simulating images originated from motion picture or other photographic film, the method including: storing in a memory conversion data correlating color and black component values of picture pixels in the video originated images with modified component values, the conversion data being selectible for the picture pixels based on a plurality of parameters including lighting conditions; reassigning values for the color and black component values for substantially each picture pixel within each frame of the video originated images in dependence on the modified component values selected from the memory thereby producing intermediate video images; instilling selected film grain patterns of optional density and size into the intermediate video images; and producing the final video images from the intermediate video images which have had the film grain patterns instilled therein.

According to yet still a further object, the invention relates to a method for converting video originated images into final video images simulating images originated from motion picture or other photographic film, the method including storing conversion data in a memory correlating color and black component values of picture pixels in the video originated images with modified component values, the conversion data being selectible for the picture pixels based on a plurality of parameters including lighting conditions and camera setting; reassigning values for the component values for substantially each picture pixel within each frame of the video originated images in dependence on the modified component values selected from the memory and thereby producing intermediate video images; and producing the final video images from the intermediate video images.

The present invention thus provides a video signal modification system for converting video-originated images into final video images simulating images originated from motion picture and other photographic film. To this end, conversion data located in, e.g., look-up-tables, or derived from color data within filmed images originated simultaneously as the video originated images, from the same scene as delivered through the same lens, are used for reassigning color and black component values to the picture pixels in the video-originated images with the help of computing means thereby to produce intermediate video images. Grain pattern instilling means instill selected film grain patterns of optional density and size into the intermediate video images thereby to produce final video images which appear as though they were derived from motion picture or other photographic film stock.

According to another aspect of this invention, means are provided for digitally modifying images shot under even, controlled lighting conditions, in one embodiment according to look-up-tables based on a second image medium's digital component binary response logs. According to the invention, the image medium from which the image destined for component modification is originated is not limited to any single electronic or photo-chemical image originating/ storing medium. Further, the image medium which is being simulated by way of the component modifications is also not limited to being any one electronic or photo-chemical medium.

According to this embodiment, the invention comprises a method for processing information in an image originated on a first medium into data representative of a modified image simulating an image originated on a selected second medium, comprising producing digital data representative of the color component response of a selected second medium under a selected group of variables affecting the response of the second medium to subject colors; storing said digital data in a memory for use in modifying digital data representative of color component values within said image originated on the first medium to simulate each corresponding component response within an image originated on said second medium.

According to this embodiment, the invention further comprises apparatus for processing information in an image on a first image storing medium into data representative of a modified image simulating an image originated on a second image storing medium, comprising means for producing digital data representative of the color component response of a selected second medium under a selected group of variables affecting the response of the second medium to subject colors; means for storing said digital data in a memory for use in modifying each digital component in the image originated from the first medium to simulate each corresponding component of an image originated from the second medium; means for correlating data derived from the image from the first medium with said digital data representative of the color component response of the selected second medium; means for selectively modifying said information in the image originating on the first medium based on the digital data representative of the color component response of the selected second medium, thereby to simulate in said image originating on the first medium characteristics of said second medium.

This invention furthermore provides the option of secondary means for imparting a variety of possible film-grain "textured" appearances to the image resulting from the primary components modification.

According to yet still a further aspect, the invention relates to a method for converting video originated image color data into final video image color data, simulating the image color data had the image been originated on a motion picture or other photographic film; the method including the origination of actual filmed images at the time of originating video images destined for modification, by way of a beam-splitter device capable of delivering ample image data to both a selected unexposed film stock and a selected video imaging unit. Each of these filmed images may be used as a reference for one or a number of video originated images, by a selected means for identifying selectively specific image zones, in reassigning color data to corresponding image zones within said video originated images.

The prior art of which applicant is aware and which includes means to simulate the color response of film from video originated images, does have the limitation of requiring uniform and predominantly shadow free lighting. The configuration of the system according to one embodiment of the invention, described herein, accomplishes the color "correction" phase of the process by providing actual filmed reference frames of the exact image being videographed, on any selected film stock, to be used in reassigning color component values by selected "zones" of the video originated images.

Existing film cameras with "video assists" which incorporate advanced beam splitting and fiber optic video tap technology, provide means to provide high resolution video images and filmed images by way of a single lens, of the same original image. The "Vidiflex" system distributed by Cinema Products, Corp. is one such system, allowing for as little as 10% of the beam-split lens image to be relayed to the video tap unit (while still producing a fully broadcast quality video image,) as the remaining 90% of the split image is relayed for proper photographic exposure of a selected 35 mm film stock, the television industry standard.

The present invention involves such beam splitting means to relay the lens image to both a selectively high resolution video unit, (which may be a high definition video unit,) and to the emulsion of a selectively small gauge size of photographic film. This camera, preferably configured primarily as a video camera, would provide the option of exposing the "reference" film frames at slower frame rates than the industry standard, 24 film frames per second; by exposing as few as a single frame of film per second for example, on as small as 8 mm film, for example, the elements of film production cost are greatly minimized. In essence, the camera unit becomes a video camera with a "film tap," instead of the typical use of the "video tap," or "video assist" technology, which is the reverse. During original videography the needs of both capturing a proper video image and properly exposed film image must be considered, as both have input into the appearance of the final, on line images provided by way of this system.

In post production, after all final video material has been edited, that film corresponding to the selected final video images would be processed and digitized. Existing digital means to identify and isolate image zones, including those programs which identify image areas involving selectively similar ranges of color, (black, luminance or other selected image characteristics,) may isolate image areas to be precisely referenced against those identical selected image areas within the film originated material, which was derived from the simultaneously recorded original image.

Programming providing for a selectively detailed averaging of color values within the matching zones or digitized filmed images, would then allow for new values to be assigned to the original video zones, allowing the video originated images to approximate the color response of the filmed images of the same original scene with selected specificity. Presently utilized technology and advancements such as those disclosed in Takakura (U.S. Pat. No. 5,264, 946) provides means to identify and extract image regions based on gray levels, chromaticity positional information, or differential values of an image, among other means, with discrete threshold settings allowing for quite discrete isolation of desired image zones. Firms specializing in the colorization of black and white films use various effective means for automatic identification of image zones by image characteristics, for assignment of selected color data to those zones.

Should it be desired that one image derived from film is to be used in reassigning color value data to more than a single video originated image, (allowing for slower film frame rate speed during original shooting,) existing digital technology can provide that:—the selectively specific image zones isolated for modification based on the averaged filmed color values from respective image zones, may continue to be identified and modified within several sequential video-originated frames, based on a single film originated image's color data. The identification of these zones within subsequent frames of video originated material may be based on the identification of a selected range of color values as they shift within a selectively small area of the entire image, or by other existing means. Aesthetically, a happy medium of video originated images per film originated reference image may be reached based on the degree of specificity of the zoned color modifications and the maintenance of a convincing, film-originated color response "look" within the modified video originated material. The firm American Film Technologies of San Diego, for example, utilizes existing technology to automatically reassign color data in a series of video images from a single "key frame" image, which in the context of the present system allows for a single filmed image to provide discrete image zone color data to a series of images from a single scene, wherein all objects within subsequent frames are present in the filmed "key frame" color reference image.

The color modified, video-originated material may then be displayed, recorded directly, or subjected to the physical or digital "film stock grain pattern instilling/simulation" means disclosed in this application and in its parent applications, e.g., U.S. Pat. Nos. 5,374,954 and 5,140,414. The digital grain instilling means may include the option of the generation of random noise (or digital pseudorandom noise), which is introduced into each video image, such as that disclosed by Beesely in U.S. Pat. No. 4,771,342. A physical grain instilling means may include the videography of images as formed on a grain embodying, film sheath and the actual recording of digital image data onto unexposed film, by way of a digital film recorder apparatus.

Further, the modified video may also be subjected to an additional existing process involving inter-field interpolation, lending the video originated images the frame-rate visual impression inherent to film originated images following telecine transfer to video. This means for dropping and repeating image data over selected video fields to simulate the frame rate appearance of video images originated on film, (which accounts for an aspect of the appearance of film when transferred to video, including a familiar "strobing" appearance when objects move within the image,) is disclosed in Faber U.S. Pat. Nos. 5,335,013, and 4,935,816. The resulting video may then have images distributed over a modified number of video fields each second, (instead of the typical 60 fields, providing 2 fields per image,) ideally serving to simulate the standard 24 images per second of filmed material, when they are distributed over the standard 60 fields of video, by way of a telecine transfer.

Other features and advantages of the present invention will become apparent from the following description of the invention which refers to the accompanying drawings.

BRIEF DESCRIPTION OF THE DRAWINGS

FIG. 8 shows the process of reassigning color data in video originated images from filmed image data.

DRAWINGS REFERENCE NUMBER

Figure 1:
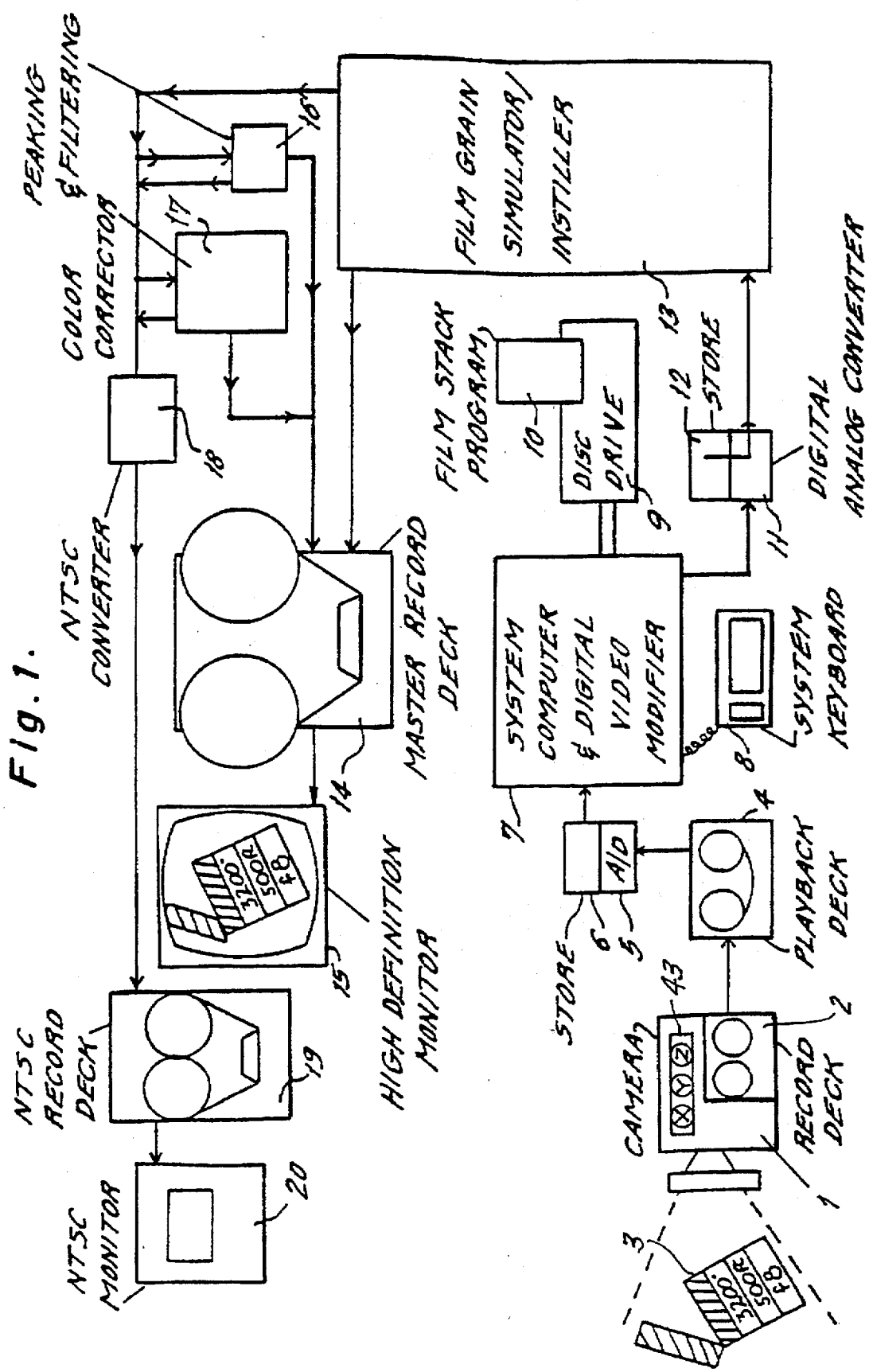
FIG. 1 is a block diagram of the video modification system and the path of video signals therein.

1—High definition camera; principal videography
2—High definition record VTR
3—Slate with system relevant data for each scene
4—High definition playback VTR
5—Analog-Digital converter
6—Frame store
7—System computer/pixel data digital modifier
8—System keyboard
9—Disc drive
10—Film stock component simulation program
11—Frame store
12—Digital-Analog converter
13—Film grain simulator/instiller apparatus
14—High definition master record VTR
15—High definition monitor
16—Optional, external signal peaking/filtering systems
17—Optional, external manual color correction device
18—High definition-NTSC converter
19—NTSC broadcast format record deck
20—NTSC monitor
21—High definition video projector
22—High definition camera
23—Variable macro lens for projector
24—Variable macro lens for camera
25—Auto focus puller from 35 mm to 16 mm image width
26—Camera auto focus puller, 35 mm to 16 mm image width
27—Torque motor
28—Intermittent advance motor
29—Roller/celluloid sheath assembly raise-lower motor
30—Assembly support/reposition screw
31—Assembly celluloid containment rollers
32—Projected image manifest zone
33—Tracks
34—Projector and Camera dolly in-out motor
35—Projector/Camera reposition screw
36—Variable density celluloid sheath/length
37—Fixed assembly support pillar
38—Assembly frame
39—Camera to projector synch generator
40—Variable density projector filter
41—Projector filter reposition motor
42—Celluloid sheath plane tension/stabilization rollers
43—Principal videographic data input controls; X-color temperature; Y-brightness; Z-t-stop or other additional data
50—Slating of lighting variables, at image originating, relevant to this system.

51—Image originating camera; electronic or photographic.
52—High resolution optoelectric digital film scanner.
53—Digital video playback deck.
54—Digital frame store.
55—System computer and binary component data modifier.
56—System keyboard and manual aesthetic image modification controls.
57—Image media correlating, component referencing look-up-table programs.
58—Digital frame store, containing modified image data.
59—Digital grain pattern instilling program/system.
60—Digital film recorder.
61—Chemical film processor.
62—Motion picture or single image scanner to digital data.
63—Film projector.
64—Videography of videoprojection grain pattern instilling apparatus
65—Video camera component of apparatus, 64.
66—Video projector component of apparatus 64.
67—Light transmissible celluloid sheath assembly of apparatus, 64.
68—Photo CD recorder,
69—Modified video data recorder.
70—System monitor for final display, and manual image modifications.
71—Image originating camera, comprising a selectively small gauge size film recording means, image dividing "beam-splitter," and video "tap" unit, (preferably a high resolution fiber optic, digital unit.)
72—Digital store, deriving images from video originated material.
73—Digital computer and programming means to isolate image zones and to replace component values with average color value data identified within selected zones of film originated, digitized images.
74—Interfield interpolation system, redistributing images over a modified number of video fields to simulated the frame rate appearance of film originated material presented on video, from video originated material.
75—Video recording means, to store the modified video material following the process of interfield interpolation process of redistributing image data over selected video fields.

SYSTEM FUNCTION SIGNALS

D1—Playback deck, single frame advance signal
D2—Keyboard to system computer data
D3—Look-up-table data, to computer internal memory
D4—Camera/Projector 35 mm-16 mm reposition signal
D5—Camera/projector 35 mm-16 mm refocus signal
D6—Celluloid assembly raise/lower signal and projector filter raise/lower signal
D7—Celluloid containment rollers intermittent advance signal
D8—Gen. lock signal from camera synch generator
D9—Master record, single frame insert record signal

DETAILED DESCRIPTION OF THE PREFERRED EMBODIMENTS

In FIG. 1, the production stage of this system includes: a high definition video signal being provided by a selected camera 1, capable of outputting a signal derived from an oscillatory scan or preferably from a unit that performs an initial scan of at least double the 525 lines per two fields of NTSC television, which is recorded by a selected, compatible VTR 2, capable of taping the high definition signal. Lighting conditions at principal videography are conformed to one of the available lighting variable combinations, explained in detail later. These variables, namely the selected camera f-stop setting for a scene, the average brightness of the scene in foot candles, and the average color temperature of the scene in degrees Kelvin, are slated for the camera before each take, 3, or recorded onto a data track corresponding to each scene, as input through principal videographic data input controls, 43; camera setting information may be recorded automatically on to this data track leaving only lighting variables to be input manually, with the option of allowing other external devices to relay lighting and/or other principal videographic data for recording on the data track, replacing the step of slating the variable for the camera to provide visual reference to the system operator in post production. For best results in the primary color component modification process of this system, the color temperature and brightness of each zone within the area being videographed must be as uniform as possible, and illuminated by diffused, low-key lighting that discourages shadowing.

Figure 2:
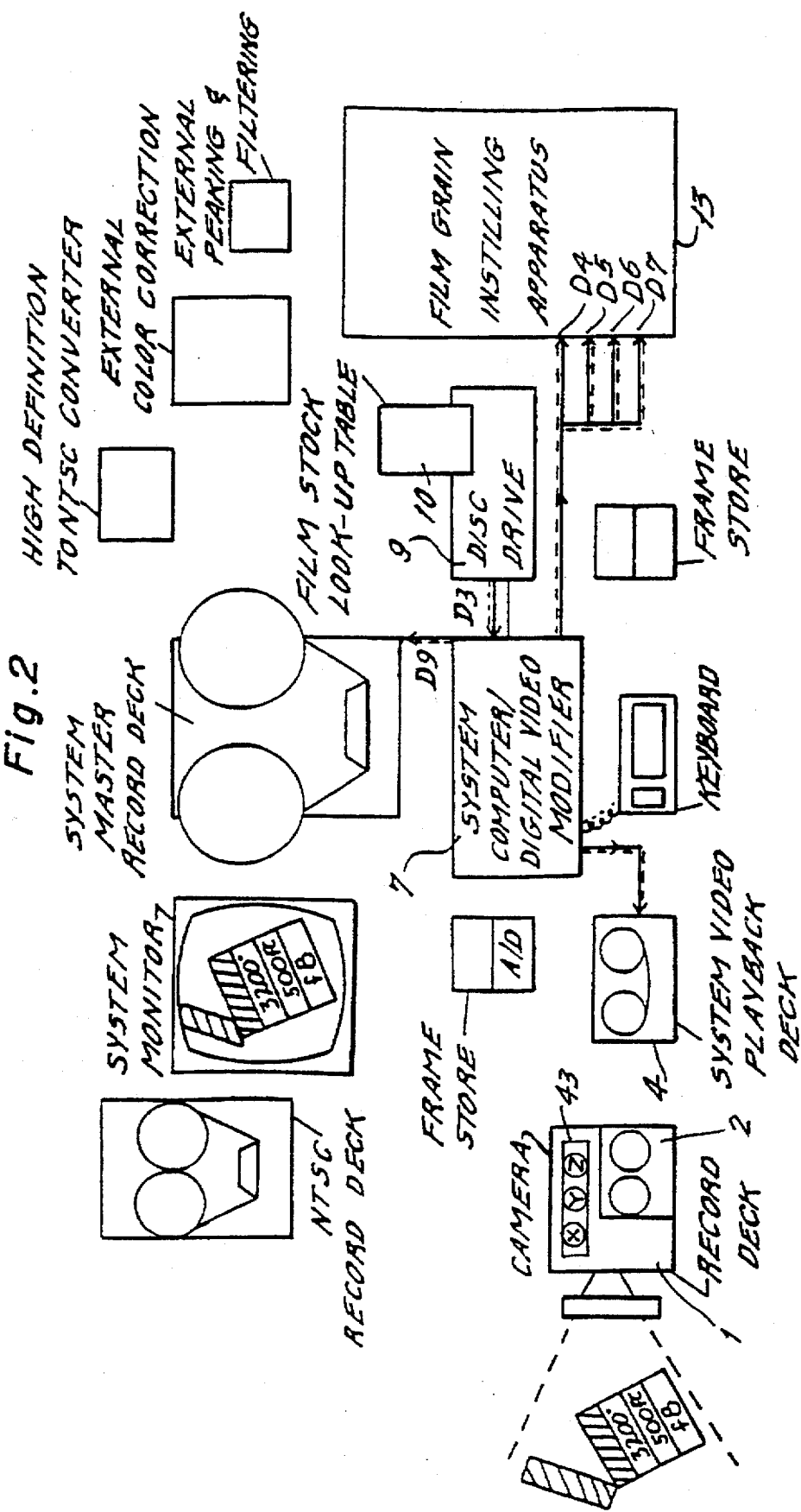
FIG. 2 diagrams the flow of system control data in the block diagram of FIG. 1, including: component advance, timing, system options, video synching and insert editing signals.

In the post-production stage of this system, FIG. 1 diagrams the path of the video signal, while FIG. 2 diagrams the flow of system data which controls timing, positioning, synching and advancing of system components. In response to a frame-advance signal D1, the high definition playback deck 4, advances one frame, and outputs this single frame of video data to analog-digital converter 5. The binary data is held in frame store 6, and read from this store by system computer 7, at the rate dictated by the time required to modify data for each red, green, blue and black component for each pixel, scan-sequentially. To perform this digital modification, a single, selected look-up-table 10, is read by disc drive 9 and relayed as data D3 to the internal memory of the system computer 7, in accordance with a table select command entered through the system computer keyboard or data referenced on the principal videographic variables recorded data track.

The look-up-table selected is of the one-dimensional kind and is an element of a larger program which is representative of component responses of video material originated on a single film stock, in a variety of lighting circumstances. The digital representation of the film component responses are derived from telecine, flying-spot-scanner transfer to videotape: By filming color charts and grey scale charts containing at least those gradients deemed registrable by broadcast NTSC television and charting the binary component-data results against video originated images, shot with the selected high definition camera unit of this system, of the same charts under the identical lighting conditions, a basis for translation is formed. A simple film stock program might contain tables for five f-stop settings, ten light intensity possibilities and five color temperature options; a total of 250 look-up-tables, contained on discs or another storage medium grouped according to f-stop setting, or depending on the volume of data within each table, an f-stop and a color temperature, with all lighting intensity options for the two fixed variables resulting in ten tables per disc, etc.

Within a look-up-table, the component value translations may be as specific as to address the actual subtlety of film and the large number of color and grey scale gradients color negative film can register. Because the process is designed for eventual display on a video monitor, however, the degree of specificity needed is immediately diminished by the inherent limitations of video. If data groupings of video data derived from videography of the charts are to be defined by those component gradients registrable by NTSC broadcast television, the range of original video component data in a single grouping is broadened further, and number of corresponding look-up-table "answers" are reduced in comparison to the huge number of groupings that might be logged. So, the degree of detail available within a single look-up-table, or the table's capacity, is determined by the intended display system and a determined level of modification deemed acceptable as a compromise between the size of the tables to be assembled and the aesthetic result of the component modifications; it is an option determined by the intricacy of a given program assembled for this system as implemented by a system computer internal memory capable of storing at least a single table of the greatest detail that might be needed for the most sensitive monitoring systems applicable.

Each component's digital "word" is thus read, for each pixel, and replaced by the corresponding answer "word" which is referenced in the table and determined to govern the range of original videography data in which the "word" submitted falls. The binary response, indicating the approximate anticipated component value response had the program film stock been the original image storage medium, is output to a receiving frame-store 11, in which the revised frame of digital video data is assembled. This data is then converted to analog format by digital-analog converter 12, and is relayed at normal scanning rate, for display, to apparatus 13 for a secondary modification.

Figure 3:
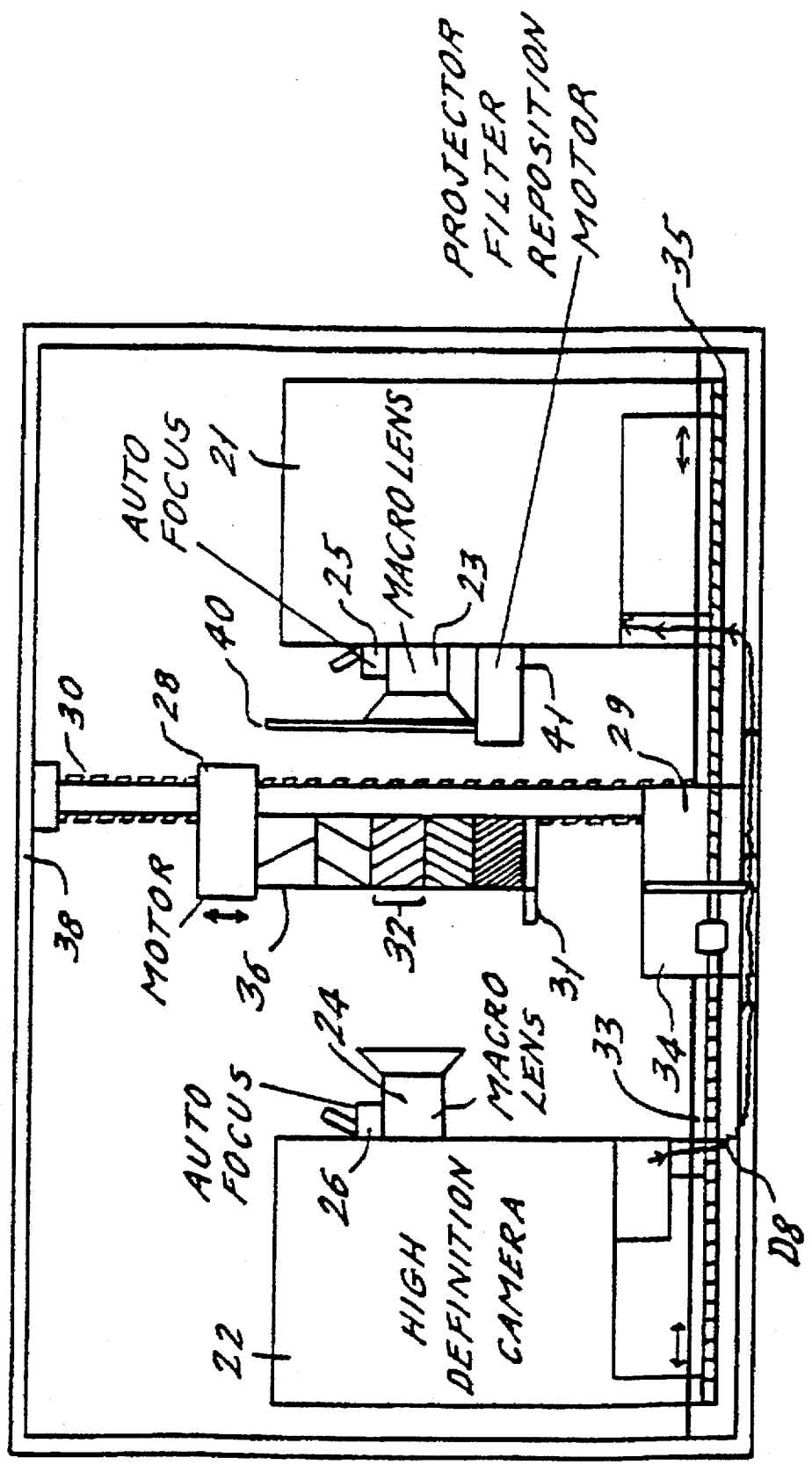
FIG. 3 shows in detail, the variable density film grain-instilling apparatus from the left side.

Apparatus 13 is designed to instill physically a variety of actual film-emulsion grain appearances to images manifested from the primary digital modification process of this system. As detailed in FIG. 3, diagramming the film-grain instilling apparatus, high definition projection unit 21 is the component which receives the modified high definition analog video signal. This projection unit is preferably of the type capable of reproducing the level of definition and number of scan lines provided by the video signal. Facing the projection unit lens is a high definition camera unit 22, to which the projector is gen-locked, by means of a synching signal D8, output to the projector by the camera unit internal synch generator 39. The camera and projector are mounted on tracking 33, which is itself fixed in the film grain instilling apparatus assembly frame, 38. By means of motor 34, the camera and projector units move simultaneously toward or away from each other in response to a signal D4 output by the system computer, which commands the units to approach each other a short distance if 16 mm film grain is to be simulated, or to move away to simulate a 35 mm grain size. Other mechanical means to vary the lens positions of the camera and projector units, 21 and 22, may also be employed in lieu of tracking, providing means to vary the size of the projected image manifest zone and corresponding framing of the camera, with the units 21 and 22 remaining fixed in the apparatus assembly frame, 38. Variable focus, macro lenses 23 and 24, on both the projector unit and the camera unit also respond accordingly to system computer generated signal D5 by focusing for an image manifest area of either 16 mm or 35 mm in width automatically, as provided by focus-pulling motors 25 and 26.

Figure 4:
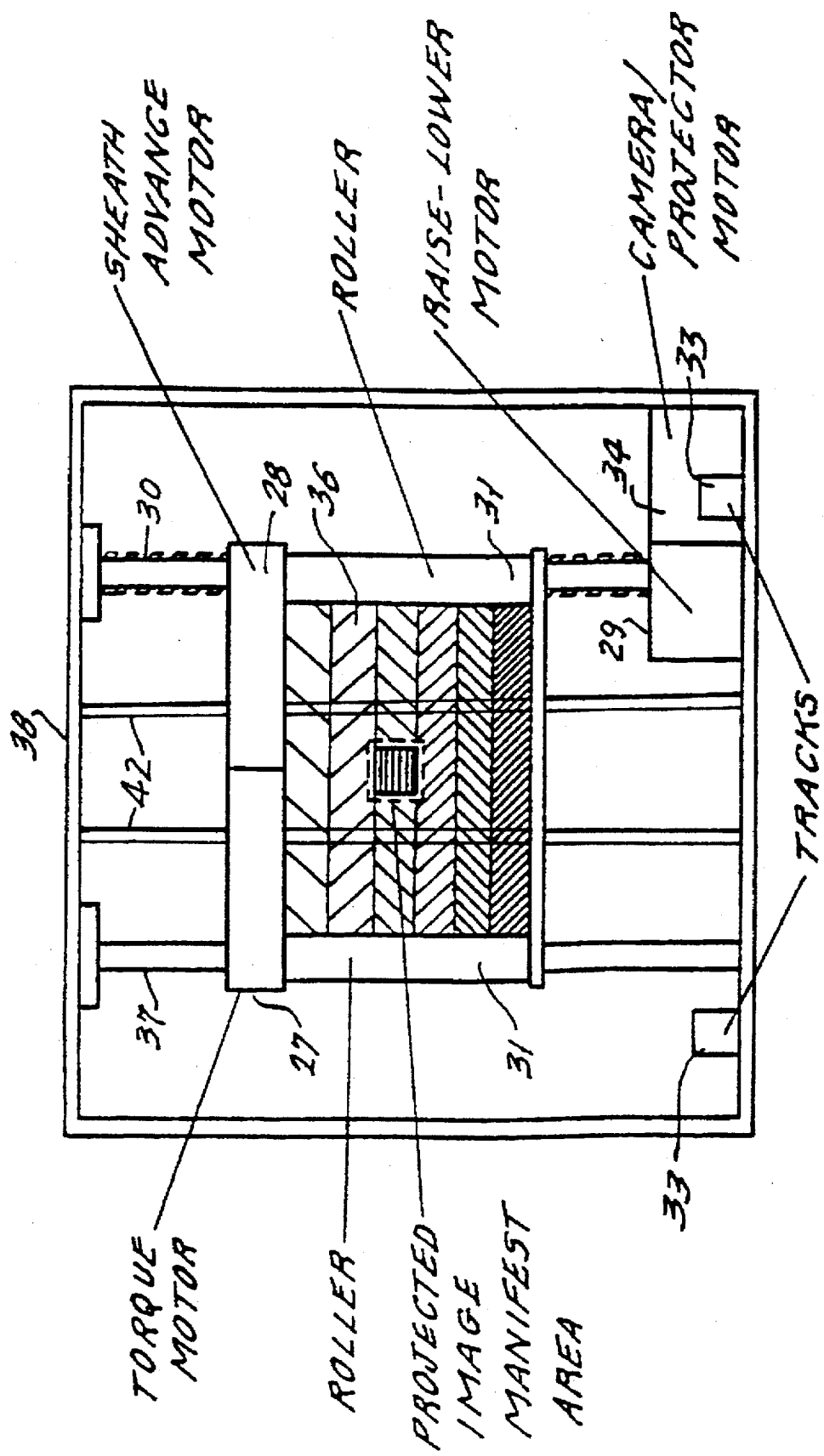
FIG. 4 shows in detail, the celluloid containment assembly portion of the film grain-instilling apparatus, from the viewpoint of the camera unit of the film grain-instilling apparatus.

Between the camera and projector lenses is a grain embodying, light transmissible surface, preferably comprising a sheath of celluloid 36, and preferably comprised of reversal motion picture film stock, which is contained between two rollers 31, and kept taut between the containment rollers by torque motor 27. Stabilization rollers with the ability to rotate, 42, are mounted in the assembly frame 38, as are the sheath containment rollers, and these stabilization rollers hold the section of celluloid on which the videoprojection is manifested on one plane, relative to the projector and camera lenses, at all times. Being of at least a meter in length and at least 175 mm in width, (meaning top to bottom in FIG. 4), the portion of the celluloid length not visible between the containment rollers, is "spooled" on the rollers. Comprised from top to bottom of 35 mm strips of different grain density and thus darkness, the celluloid length is a continuous piece containing grey scale gradient strips created by actually exposing and processing the celluloid-film sheath for this use, accordingly.

Supported by roller assembly support 37 and support screw 30, which are mounted in celluloid roller assembly support frame 38, the rollers and celluloid length can raise or lower, placing a grey celluloid strip of a different darkness in line with the projector beam's image manifest area 32, as assembly raise-lower motor 29 turns support screw 30, in response to data received from the system computer as signal D6. Also in accordance with the D6 signal, a variable density filter 40, mounted over the lens of the projector unit, is repositioned to a density section, by motor 41, to compensate for the darkness of the celluloid density strip selected on which to manifest the projection, so that from the camera side of the celluloid, a constant level of brightness is maintained for a given image projected, regardless of the grey scale gradient of the celluloid strip selected as the image manifest surface.

Torque motor 27, has an advancing motor 28 within its housing which moves the rollers, and thus celluloid length, in either direction on receipt of celluloid advance signal D7; this torque/advance motor combination has means to advance intermittently the rollers, in a possible configuration, not less than 20 mm, up to 30 times each second. Also, a switch triggered as the celluloid nears the end of its length on either roller, reverses the direction of the advancement, without slowing or interrupting the intermittent motion.

The camera unit's scan of the emulsion layer of the celluloid image-manifest area 32, on which both the camera and the projection are focused, is of a type which reproduces the maximum number of the scan lines manifested on the celluloid surface; both units being aligned appropriately, the high definition camera should scan synchronously with the projector, maintaining a high degree of definition and image integrity in videographing the projection, without noticeably altering the projected color components. The resulting image videographed will embody the selected grain textured appearance of the celluloid emulsion as an aspect of the overall video image.

The high definition signal output by the camera unit may be subjected to external peaking and filtering controls 16, or may be converted by an external unit 18 to NTSC standards for broadcasting or standard monitor display 20, or recording 19; an external aesthetic color adjusting system 17, familiar in adjusting signals derived from telecine transfers, may also be employed in final signal adjustments. The high definition camera signal may be recorded directly by high definition master VTR 14, in response to insert frame record signal D9, or the signal may be output to the deck by optional external components 16 or 17, depending on final signal patching.

From the high definition master VTR 14, the image is relayed as a complete frame to compatible high definition monitor 15. From this balanced monitor display, all aesthetic system adjustments to a scene are made by previewing a single frame and those resulting changes different film stock programs, celluloid density strips for projection, or manual adjustments made through external color or signal modifiers would have on the original video image. In a more sophisticated system, technology such as cascade filtering circuit technology, (U.S. Pat. No. 4,885,787) may provide means to modify pixel data quickly enough to preview and view modifications of scenes in real time, so option settings need not be made according to the appearance of a single image and real-time modifications can be seen before they are insert recorded. A configuration of the system of the present invention may also provide for a system computer with an internal memory capable of recalling an entire film stock program, instead of just one look-up-table, the minimum amount of data necessary for modification of a complete video frame; this would save time during set-up for modification of each new scene having a different corresponding look-up-table within the same film stock program. Additionally, principal videographic variables input through controls 43 and/or recorded automatically on a data track corresponding to each shot or scene could provide means for automatically loading and/or referencing a given look-up-table, rendering manual input of variables corresponding to each shot unnecessary, and allowing for the option of unmanned, off-line modifications of material for aesthetic evaluation of results and options.

Though the present system strives to maintain a superior video definition level to NTSC, PAL or other television standard throughout to compensate for any loss of original image integrity incurred through the film grain-instilling process of apparatus 13 (FIG. 1), a configuration of this system for the purpose of deriving an NTSC, PAL or other television standard signal from NTSC, PAL or other television standard video originated material is possible with a corresponding compromise to the image derived from the resulting video signal. Referring to FIG. 1, camera 1 might be replaced by a well balanced NTSC, PAL or other television standard unit with its signal being recorded on a broadcast NTSC, PAL or other television standard deck, 2. NTSC deck 4, would relay a frame of video to analog-digital converter 5, and this digital data would be held in store 6, which would be of a corresponding lesser capacity than the former store which held data binary data for a high definition video frame. Computer 7 would execute a total number of pixel-component modifications per frame of approximately half that needed for the high definition configuration, and thus the time frame needed for this phase could be correspondingly reduced. The programs and look-up-tables would remain the same, as they address the modification of each pixel, and would not be changed by the fact that fewer total pixels per frame are being modified. Store 11 would need only the capacity to hold data supplied by computer 7 corresponding to the number of resolved lines provided by the television standard used. This frame would be converted to analog format by converter 12 and the resulting signal could be output to an external scan-doubling system which would provide high definition compatible projector 21 (FIG. 3), with a signal it would project as an image with an increased number of resolved lines, as compared to a signal where blanking manifests itself as a black line between two resolved lines.

The film grain instilling assembly 13 would remain the same, with the camera unit 22 (FIG. 3), being replaced by a unit of the selected television standard, such as those used in present telecine "film-to-tape" systems. The option of filtering and peaking controls 16 and external color correction 17 would remain, and the selected television standard signal could be routed directly from the camera unit 22 or from the optional modifier(s) for final recording by a master record deck replaced in this configuration by an NTSC broadcast format unit 19. Final display for system previewing and reviewing would occur on monitor 20, replaced by a unit of the selected television standard, such as higher performance NTSC units used in conjunction with telecine film-to-tape transferring systems. All other system functions and data signals would remain as in the high definition configuration.

As the configuration of this system can take optional forms to conform to different television standards and display uses, it is important to note that although the preferred embodiment discloses a system in which a digital signal is converted to analog and then back to digital within the two step modification process, another configuration of this system may employ all digital components, rendering all analog-digital-analog conversions unnecessary.

Figure 5:
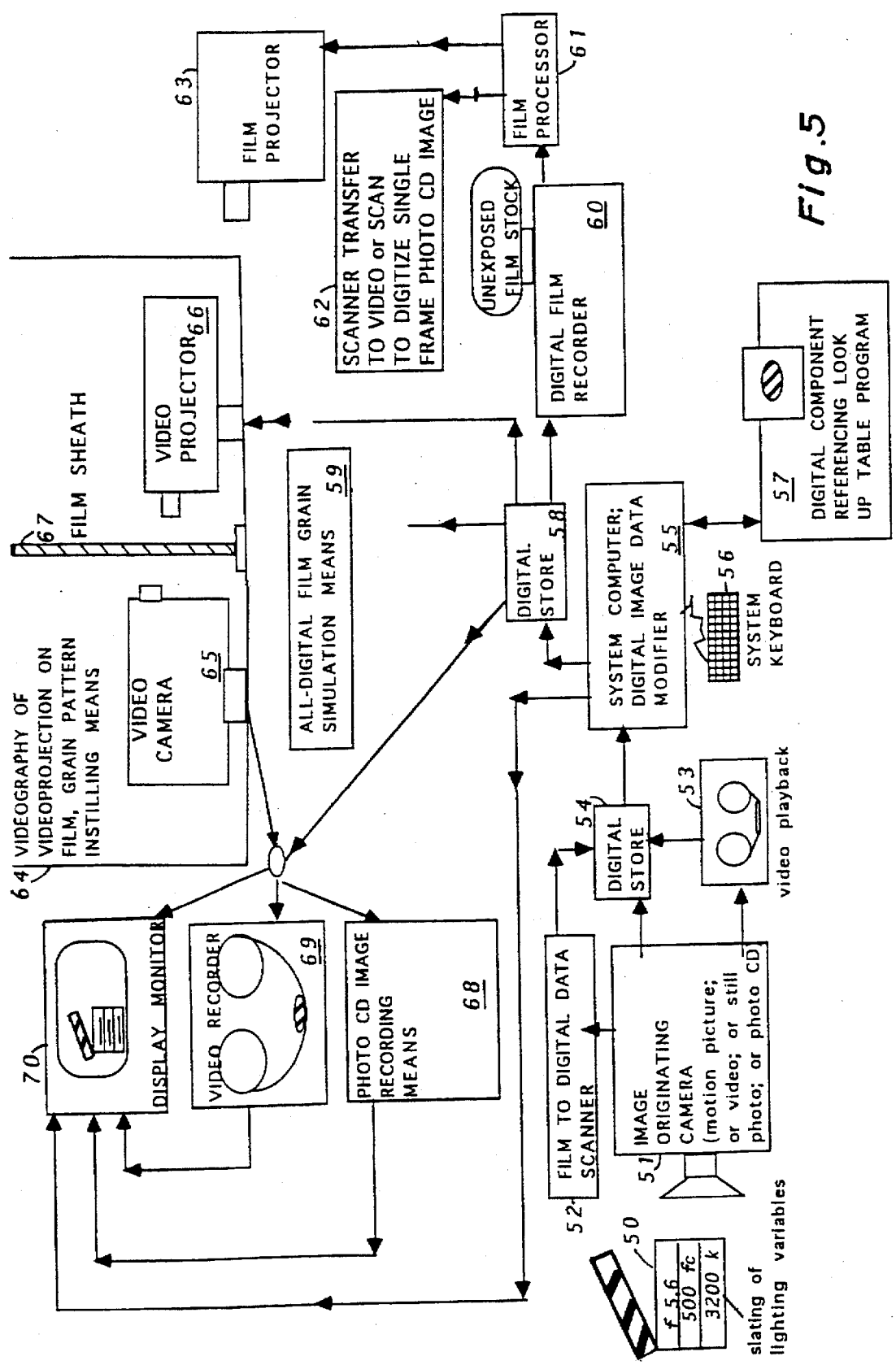
FIG. 5 is a block diagram of the modification system and the path of data therein according to a further embodiment.

FIG. 5 illustrates the broad versatility of the system according to the invention including the option of originating images, destined for modification by this system, either electronically or photo-chemically; film, video, photo CD or other cameras may thus be the means to originally record the image, as the step of digitizing images which are not already in digital form broadens the scope of both image recording media allowable for originating images to be modified by this system, and the range of possible image media which can be simulated with that original image data.

Accordingly, electronic or photographic camera 51 will capture the image, under lighting circumstances 50 which are slated or logged electronically and conforming to lighting variable circumstances for which a system look-up-table 57 is prepared. Images which are not originated as binary data are digitized by scanner 52, and relayed to digital frame store 54. Digital video playback deck 53 relays digital video images frame-by-frame to the store 54, and single image digital data such as photo CD, can be relayed directly to the store. Thus, any image originating and storing medium may be employed to originate images for this system, and reciprocally, any image originating/storing medium may be simulated with those images.

As with the previous embodiment described, digital store 54 is read by system computer 55, which executes component modifications to each component within frame store data held in store 54, reassigning binary component data indicating pixel color response, based on look-up-table 57. As with like components of FIG. 1, FIG. 5 like components function as do their counterparts in FIG. 1.

Look-up-table 57 need not be limited to programs corresponding to color response of film stocks. Component response data may correspond to any selected electronic or photo-chemical image medium, by way of digital data logging of color response of this selected medium.

Following the component modification process, image data reconstructed in store 58 may be relayed directly to video recorder 69 or photo CD recorder 68 for recording and/or to a monitor display 70; for applications in which a photo-chemical image medium is being simulated, several grain pattern instilling options may be imposed to add the textured appearance of film to the component-modified images: The videography of images projected onto a grain embodying surface process 64, described in the embodiment of FIGS. 1–4, may be employed; or, the image data can be relayed on for the addition of grain effects available through existing all-digital program 59, familiar in digital retouching of photography; or, a digital film recorder 60, such as a MacDonald-Dettweiler Associates Fire 1000 film recorder, may actually reproduce the component-modified images onto a selected, reversal film stock. Should images be physically recorded onto film, and then chemically processed with a film processor 61, the option of film projection 63, or scanning to video, digital video, or other electronic media, as shown at 62, may also be employed.

It is important that should the film recording option be employed, it is preferred if the look-up-table program 57, used in the component modification, involves response data which compensates for the inherent color response of the film stock on which the images are being digitally recorded.

Figure 6:
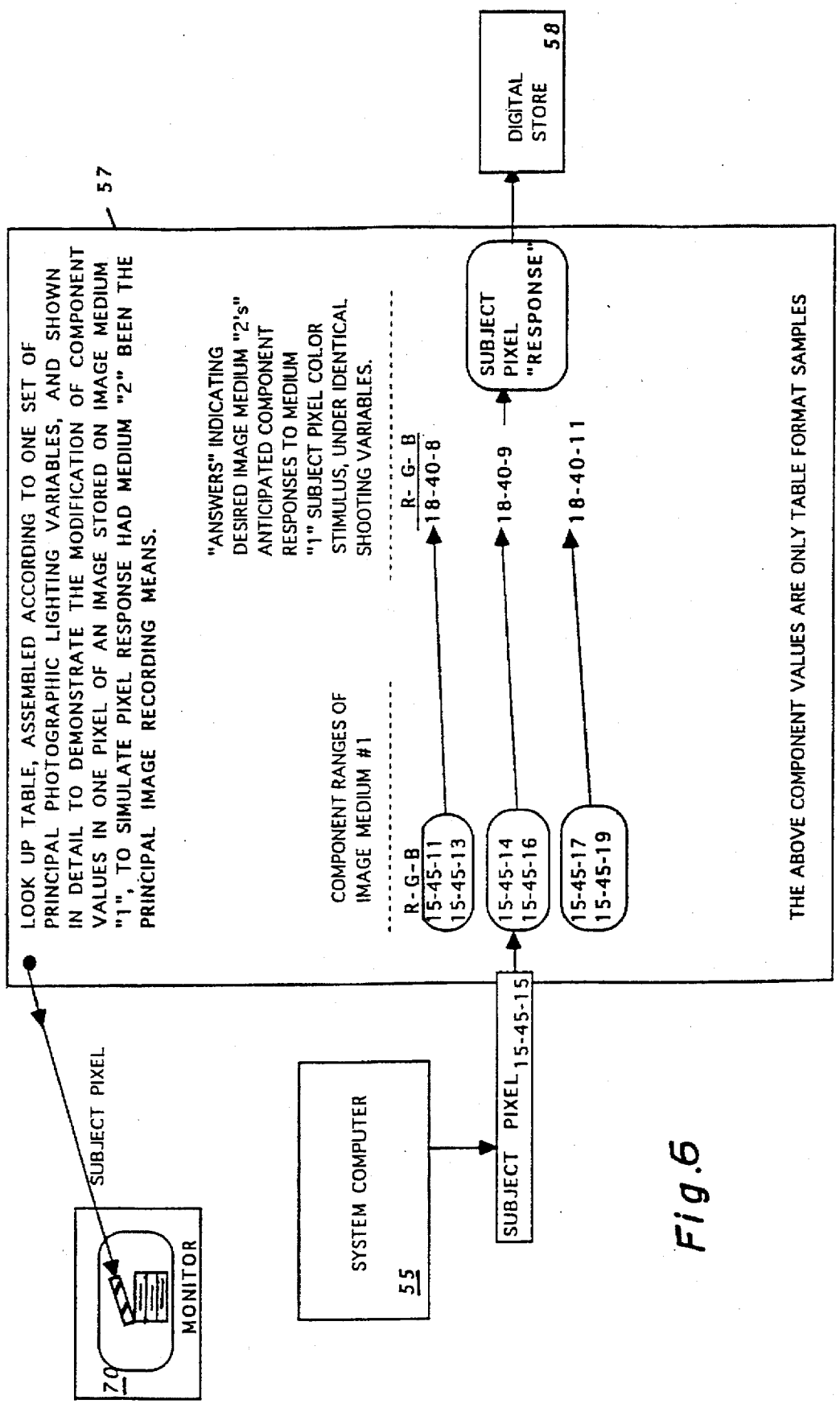
FIG. 6 diagrams the "look-up-table" reassignment process of the invention whereby components within each pixel of an image originating medium are referenced and replaced to simulate anticipated component responses of a selected second medium to the same image stimulus.

FIG. 6 shows an example of how look-up-table 57 can operate. The look-up-table is assembled according to one set of principal photographic lighting variables, and shown in detail, to demonstrate the modification of component values in one pixel of an image stored on a first image medium #1, to simulate the pixel response had a second medium #2 been the principal image recording means.

In correlating the ranges of original image data with the digitally represented color stimulus which will cause the film stock used for digital recording to register the desired component responses of the selected image medium being simulated, this new value which compensates for the anticipated color shift caused by recording film stock can replace the component values which are directly derived from data representative of the desired image medium being simulated. Through this look-up-table, the integrity of the intended component modification process is maintained.

In summary, the system described according to the invention allows any image medium to simulate images originated on another image medium.

Figure 7:
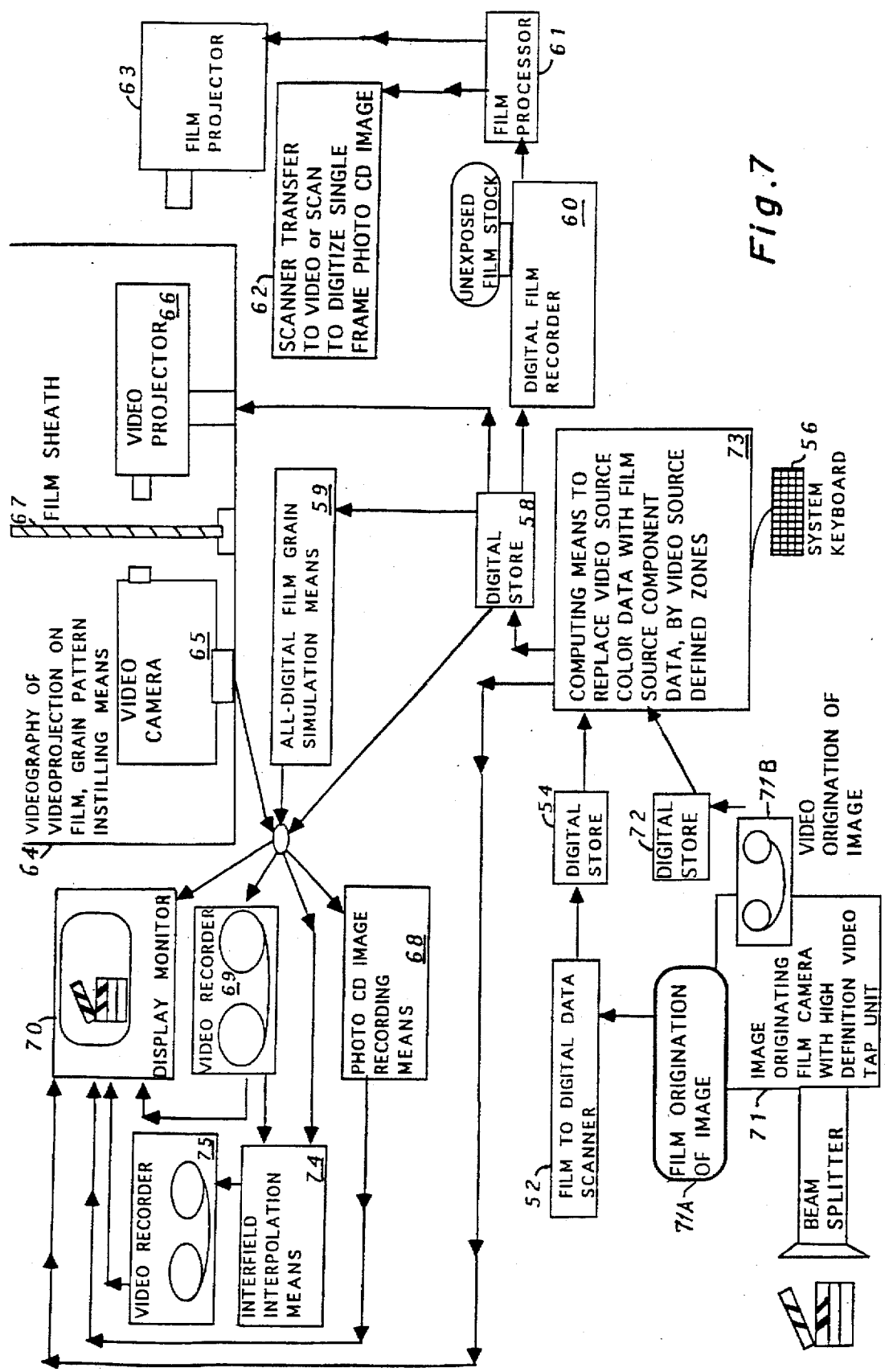
FIG. 7 is a block diagram of a further device according to the invention wherein the original image is provided by a beam-splitter to a film camera with a video tap unit.

FIG. 7 shows a further embodiment according to the present invention wherein the original image is provided by a beam-splitter to an image originating film camera having a preferably high definition video tap unit. The image originating camera, which includes a selectively small gauge size film recording means, image dividing beam-splitter and video tap unit, is generally designated at 71 in FIG. 7. Preferably the video tap unit is a high resolution fiber optic digital unit, known to those of skill in the art. The camera 71 provides a film origination of the image, designated 71A, as well as a video origination of the image, designated 71B, in FIG. 7. The film origination of the image designated 71A in FIG. 7 is converted to digital data by a film to digital data scanner 52. The data from the scanner 52 is provided to a digital store 54, the output of which is provided to a computing means 73 having a keyboard 56.

The video image 71B, which preferably is in the form of digital data, is provided to a digital store 72, the output of which is provided to the computing means 73.

Computing means 73 replaces the video source color data with film sourced component data by video source defined zones. This will be discussed in greater detail below.

The output of the computing means is provided to a display monitor 70 and also to a digital store 58. Devices 58, 59, 60, 61, 62, 63, 64 65, 66 and 67 function in the same way as described with respect to FIG. 5.

The output of the digital store 58 is also optionally provided to the display monitor 70, a video recorder 69, and a photo CD image recording means 68. The output of the photo CD image recording means 68 may also be provided to the display monitor 70. In addition, the output of the digital store 58 is optionally provided to an interfield interpolation means 74 (described below), the output of which is provided to a video recorder 75 and then to the display monitor 70. In addition, the output of the video recorder 69 can be provided directly to the display monitor 70 and also to the interfield interpolation means 74 for subsequent recording on video recorder 75 and display on display monitor 70.

As discussed, the prior art which includes means to simulate the color response of film from video originated images, does have the limitation of requiring uniform and predominantly shadow free lighting. The configuration of the system of the invention, described herein, accomplishes the color "correction" phase of the process by providing actual filmed reference frames of the exact image being video graphed, on any selected film stock, to be used in reassigning color component values by selected "zones" of the video originated images. This is done by splitting the image into the two images 71A and 71B.

Existing film cameras with "video assists" which incorporate advanced beam splitting and fiber optic video tap technology, provide means to provide high resolution video images and filmed images by way of a single lens, of the same original image. The "Vidiflex" system distributed by Cinema Products, Corp. is one such system, allowing for as little as 10% of the beam-split lens image to be relayed to the video tap unit (while still producing a fully broadcast quality video image,) as the remaining 90% of the split image is relayed for proper photographic exposure 35 mm film stock, the television industry standard.

The present invention uses beam splitting camera 71 to relay the lens image to both a selectively high resolution video unit, (which may be a high definition video unit,) and to the emulsion of a selectively small gauge size of photographic film. This camera 71, preferably configured primarily as a video camera, provides the option of exposing the "reference" film frames at slower frame rates than the industry standard, 24 film frames per second; by exposing as few as a single frame of film per second, for example, on as small as 8 mm film, for example, the elements of film production cost are greatly minimized. In essence, the camera unit is a video camera with a "film tap," instead of the typical use of the "video tap," or "video assist" technology, which is the reverse. During original videography the needs of both capturing a proper video image and properly exposed film image must be considered, as both have input in to the appearance of the final, on-line images provided by way of this system.

In post production, after all final video material has been edited, that film corresponding to the selected final video images would be processed and digitized. Existing digital means to identify and isolate image zones, including those programs which identify image areas involving selectively similar ranges of color, (black, luminance or other selected image characteristics,) can isolate image areas to be precisely referenced against those identical selected image areas within the film originated material, which was derived from the simultaneously recorded original image.

Programming providing for a selectively detailed averaging of color values within the matching zones or digitized filmed images, known to those of skill in the art, can then allow for new values to be assigned to the original video zones, allowing the video originated images to approximate the color response of the filmed images of the same original scene with selected specificity. Presently utilized technology and advancements such as those disclosed in Takakura (U.S. Pat. No. 5,264,946) provides means to identify and extract image regions based on gray levels, chromaticity positional information, or differential values of an image, among other means, with discrete threshold settings allowing for quite discrete isolation of desired image zones. Firms specializing in the colorization of black and white films use various effective means for automatic identification of image zones by image characteristics, for assignment of selected color data to those zones.

Should it be desired that one image derived from film is to be used in reassigning color value data to more than a single video originated image, (allowing for slower film frame rate speed during original shooting,) existing digital technology can provide that:—the selectively specific image zones isolated for modification based on the averaged filmed color values from respective image zones, may continue to be identified and modified within several sequential video-originate frames, based on a single film originated image's color data. The identification of these zones within subsequent frames of video originated material may be based on the identification of a selected range of color values as they shift within a selectively small area of the entire image, or by other existing means. Aesthetically, a happy medium of video originated images per film originated reference image may be reached based on the degree of specificity of the zoned color modifications and the maintenance of a convincing, film-originated color response "look" within the modified video originated material. The firm American Film Technologies of San Diego, for example, utilizes existing technology to automatically reassign color data in a series of video images from a single "key frame" image, which in the context of the present system allows for a single filmed image to provide discrete image zone color data to a series of images from a single scene, wherein all objects within subsequent frames are present in the filmed "key frame," color reference image.

The color modified, video-originated material may then be displayed on monitor 70, recorded directly (60), or subjected to the physical (64) or digital (59) "film stock grain pattern instilling/simulation" means disclosed herein. The digital grain pattern instilling means can include the option of the generation of random noise (or digital pseudorandom noise), which is introduced into each video image, such as that disclosed by Beesely in U.S. Pat. No. 4,771,342. The physical grain pattern instilling means can include the videography of images as formed on a grain embodying, film sheath, or the actual recording of digital image data onto unexposed film, by way of a digital film recorder apparatus.

Further, the modified video may also be subjected to an additional existing process involving inter-field interpolation via an interfield interpolation means 74, lending the video originated images the frame-rate visual impression of film originated images following telecine transfer to video. This existing means for dropping and repeating image data over selected video fields to simulate the frame rate appearance of video images originated on film, (which accounts for another aspect of the appearance of film when transferred to video, including a familiar "strobing" appearance when objects move within the image,) is disclosed in Faber U.S. Pat. Nos. 5,335,013, and 4,935,816. The resulting video may then have images distributed over a modified number of video fields each second, (instead of the typical 60 fields, providing 2 fields per image,) ideally serving to simulate then standard 24 images per second of filmed material, when they are distributed over the standard 60 fields of video, by way of a telecine transfer.

FIG. 8 illustrates the process of reassigning color data in video originated images from filmed image data, wherein the hybrid camera 71 simultaneously relays a selected ratio of the same lens image to a CCD high resolution/definition digital video imaging unit (toward electronic process recording,) and to a selectively small gauge size of photographic film stock, (for photochemical process recording). The video originated images are provided individually to digital store 72, while the filmed images are relayed to digital store 54, following chemical processing of the film and scan to digital video, via telecine scanner, 52.

The computer 73 selectively identifies and replaces color data of image zones within the video originated image data from store 72, with selectively averaged corresponding image zone color data from the filmed images derived at the time the video images were originated, as provided via store 54. Store 72 may be reloaded one or more times with new sequential images from the same scene represented by the filmed image in store 54, allowing that filmed image to function as a "key frame," providing color data to computer 73 that can be applied to corresponding image zones in several video originated images, as those zones can still be discretely isolated within the image as they move position and change spatially, to a selectively limited degree of variance determined as acceptable in the color reassignment process.

Each modified video originated image is then relayed to store 58, toward the options of display, 70; video 75 or still image recording 68; physical instilling of the film grain patterns to the images by videography of a videoprojection 64, or by digital film recording 60; digital instilling of film grain patterns to the images, 59; and interfield interpolation 74 of sequential modified video images toward assemblage of a recorded sequence of video images that resembles filmed images' appearance when presented on video following a standard telecine film-to-tape transfer process.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for simulating a video image originated on photographic film, from a video originated image, comprising:

a camera for generating an image for first generation video recording on a video medium, and for simultaneously recording said image onto photographic film as a first generation filmed recording;

a computer for digitally reassigning color component data within said video originated image based on digital data representative of color component data within said image recorded on said photographic film.

2. The apparatus claimed in claim 1, wherein the camera comprises a single camera and the image is provided through a single lens for recording on the video medium and the photographic film.

3. The apparatus claimed in claim 2, wherein the camera includes a beam splitter for providing a selected ratio of the image provided through the lens to said film and to a selected video unit for recording on said video medium.

4. The apparatus claimed in claim 1, wherein the computer identifies selected zones within said video originated image, based on selected image characteristics, and replaces color data within said zones based on color data within corresponding zones within said image on photographic film.

5. The apparatus claimed in claim 1, wherein said camera includes:

a device for utilizing film of a selected gauge size smaller than a standard 35 mm film width in recording said image on film.

6. The apparatus claimed in claim 5, wherein said camera further includes:

a device to record said image on film at a selectively slower frame rate speed than the standard speed of 24 frames per second.

7. The apparatus claimed in claim 3, wherein the camera further includes:

a device whereby said video unit can capture an image of at least broadcast quality resolution from a selectively lesser ratio of the image, divided by said beam splitter, than the ratio of the image provided for proper exposure in recording said image on film.

8. The apparatus claimed in claim 4, wherein said computer replaces color data within said zones of video originated material, as said zones shift within a selected number of sequential video images from the same scene, based on color data within a single image from said image on film of said scene.

9. The apparatus claimed in claim 1, wherein the computer identifies selected zones within one or a selected sequential number of said video originated images of the same scene, based on selected image characteristics, and replaces color data within said zones based on color data within corresponding zones of a single image on film of said scene.

10. The apparatus claimed in claim 4, further comprising a film grain pattern instiller for imparting a film grain pattern to each of said video originated images, following digital reassignment of said color data.

11. The apparatus claimed in claim 10, wherein the film grain instiller comprises a digital film grain instiller.

12. The apparatus claimed in claim 11, further comprising a noise generator for adding random or pseudo random video noise to the video originated image following digital reassignment of color data.

13. The apparatus claimed in claim 10, wherein the film grain pattern instiller comprises a device for physically videographing images projected onto a film surface having a film grain pattern thereon.

14. The apparatus claimed in claim 10, wherein the film grain pattern instiller comprises a digital film recorder for recording of modified data onto film which is then processed and returned to video by telecine transfer.

15. The apparatus claimed in claim 1, further comprising an interfield interpolator for modifying video images, said interpolator repeating and/or dropping images over selected video fields, to simulate the frame rate appearance filmed images have when presented on video following a telecine transfer.

16. A method for simulating video images originated on photographic film, from video originated images, comprising:

simultaneously recording images onto a video medium as a first generation video recording and onto photographic film as a first generation filmed recording; and digitally reassigning color component data within said video recording based on digital data representative of color component data within said images recorded on said photographic film.

17. The method claimed in claim 16, wherein said step of simultenously recording comprises using a single camera and providing the images through a single lens for recording on the video medium and the photographic medium.

18. The method claimed in claim 17, wherein the step of simultanenously recording comprises splitting said images with a beam-splitter and providing a selected ratio of the images provided through the lens to said film and to a selected video imaging unit for recording on the video medium.

19. The method claimed in claim 16, wherein the step of digitally reassigning comprises identifying selected zones within said video originated image, based on selected image characteristics, and replacing color data within said zones based on color data within corresponding zones within said images on film.

20. The method claimed in claim 18, wherein said step of simultaneously recording comprises:

utilizing film of selected gauge size smaller than a 35 mm film width in recording said images on film.

21. The method claimed in claim 16, wherein said step of simultaneously recording comprises:

recording said images on film at a slower frame rate speed than the standard speed of 24 frames per second.

22. The method claimed in claim 18, wherein the step of simultaneously recording comprises:

capturing images of at least broadcast quality resolution from a selected ratio of the image provided by said beam splitter while providing an ample ratio of said image provided by said beam splitter for proper exposure in recording said images on film.

23. The method claimed in claim 19, wherein said step of digitally reassigning comprises:

replacing color data within said zones of video originated material, as said zones shift within a selected number of sequential video images from the same scene, based on color data within a single image from said images on film of said scene.

24. The method claimed in claim 16, wherein the step of digitally reassigning comprises:

identifying selected zones within one or a selected sequential number of said video originated images of the same scene, based on selected image characteristics, and replacing color data within said zones based on color data within corresponding zones of a single image on film of said scene.

25. The method claimed in claim 19, further comprising imparting a film grain pattern to each of said video originated images, following digital reassignment of said color data.

26. The method claimed in claim 25, wherein the step of imparting a film grain pattern comprises digitally imparting said pattern.

27. The method claimed in claim 26, further comprising adding random or pseudo random video noise to the video originated image following digital reassignment of color data.

28. The method claimed in claim 25, wherein the step of imparting a film grain pattern comprises physically videographing images projected onto a film surface having a film grain pattern thereon.

29. The method claimed in claim 25, wherein the step of imparting a film grain pattern comprises digitally recording modified data onto photographic film.

30. The method claimed in claim 29, wherein said modified data recorded onto said photographic film is returned to video following chemical processing of said film and a telecine transfer of said film to video.

31. The method claimed in claim 16, further comprising the step of interfield interpolating for modifying video images, said step of interpolating comprising repeating and/or dropping images over selected video fields, to simulate the frame rate appearance that filmed images have when presented on video following a telecine transfer.

32. A method for processing information of an image originated on a video medium into data representative of a modified image simulating an image originated on a photographic medium, comprising:

producing digital data representative of the color component response of a selected photographic medium under a selected group of variables affecting the response of the selected photographic medium to subject colors;

storing said digital data in a memory for use in modifying digital data representative of color component values within said image originated on the video medium to simulate each corresponding component response with an image originated on the photographic medium;

correlating data derived from said image originated on said video medium with said digital data representative of the color component response of the photographic medium;

selectively modifying respective information in the image originate on the video medium based on corresponding data of the digital data representative of the color component response of the photographic medium, thereby to simulate in said image originating on the video medium characteristics of the photographic medium; and further comprising:

performing interfield interpolation on said images on the video medium so as to repeat and/or drop images over selected video medium fields to simulate the frame rate that the images in said photographic medium have when presented on a video medium.

33. Apparatus for processing information in an image on a video image storing medium into data representative of a modified image simulating an image originated on a photographic image storing medium, comprising:

a digitizing device for producing digital data representative of the color component response of a photographic medium under a selected group of variables affecting the response of the photographic medium to subject colors;

a memory for storing said digital data for use in modifying each digital data color component in the image originated from the video medium to simulate each corresponding component of an image originated from the photographic image storing medium;

a correlator for correlating data derived from the image from the video medium with said digital data representative of the color component response of the photographic image storing medium;

a computer for selectively modifying respective information in the image originating on the video medium based on corresponding data of the digital data representative of the color component response of the photographic medium, thereby to simulate in said image originating on the video medium characteristics of said photographic image storing medium; and further comprising an interfield interpolator for modifying said video medium images by repeating and/or dropping of images over selected video medium fields, thereby to simulate the frame rate appearance that images filmed at 24 frames-per-second have when presented on a video medium.

* * * * *